United States Patent Office 3,552,858
Patented Jan. 5, 1971

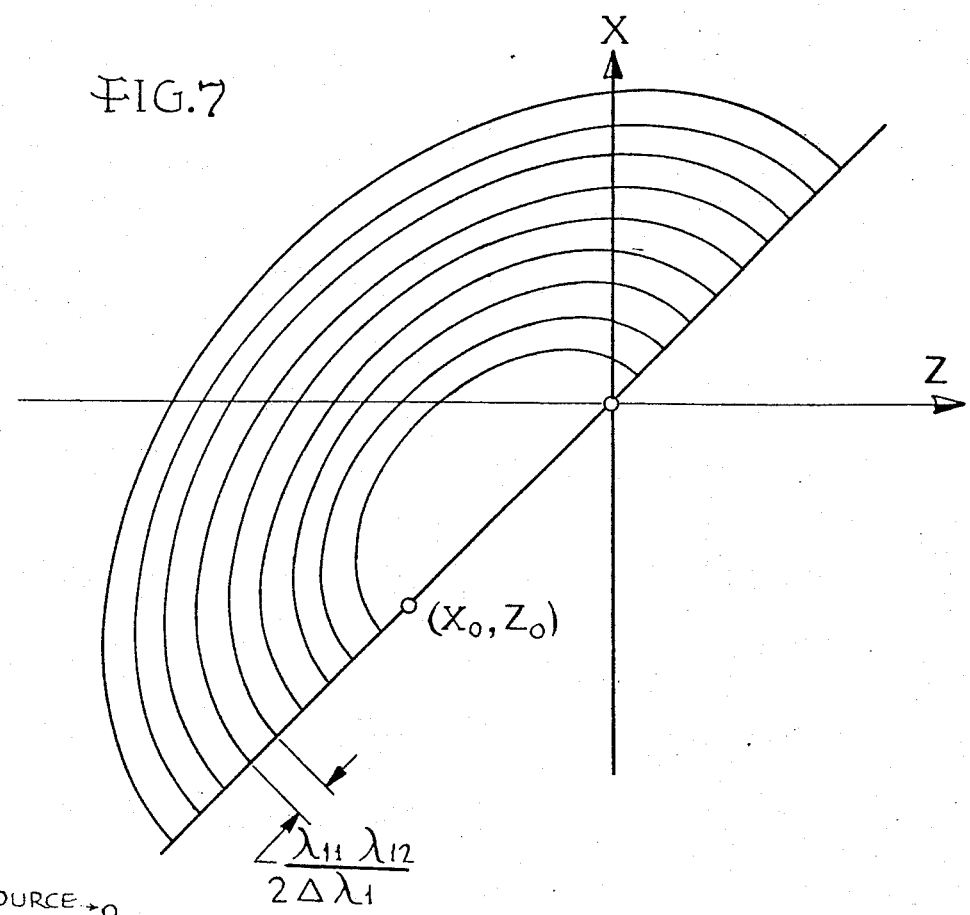
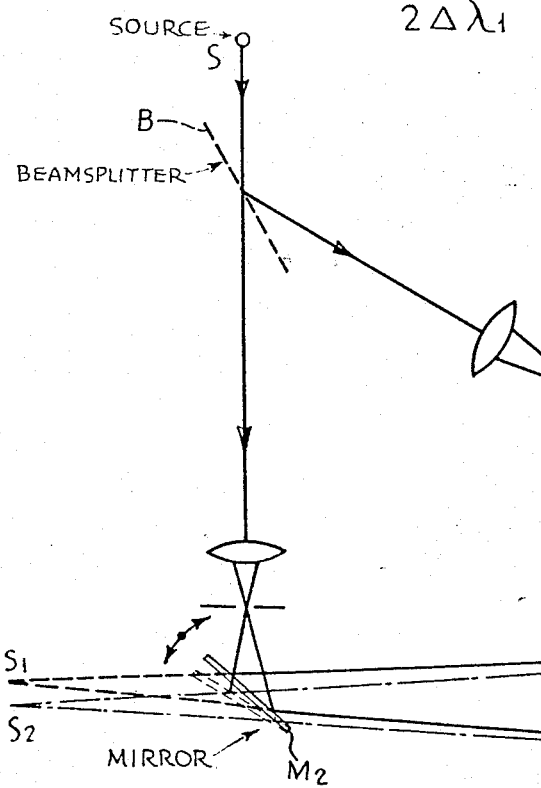

3,552,858
CONTOUR GENERATION BY WAVEFRONT
RECONSTRUCTION
Kenneth A. Haines and Bernard P. Hildebrand, Ann Arbor, Mich., assignors, by mesne assignments, to The Battelle Development Corporation, Columbus, Ohio, a corporation of Delaware
Filed Sept. 13, 1966, Ser. No. 579,111
Int. Cl. G01b 15/04
U.S. Cl. 356—109   14 Claims This invention relates to methods and apparatus for obtaining three-dimensional holographic images containing constant superimposed range contours useful in accurate cross-section tracing or contour mapping and for measurement of depth on the surface of an object. More specifically, it relates to the formation and recording of interference fringes on the object or in the object where the object is transparent. This fringe pattern is then a precise identification of points of constant depth. For purposes of simplicity throughout the specification and claims the phrase "on the surface of an object" is considered to be generic to external surfaces of opaque objects and to both external and internal surfaces of transparent objects.

The present invention is related to holography in general and including the methods of off-axis holography described in copending application Ser. No. 503,993, filed Oct. 23, 1965, by Leith et al. However, the methods of the present invention require additional complexity in the hologram-making process. One method of the present invention uses multiple illuminating sources of the same wavelength but at slightly different positions. The second method of the present invention requires an illuminating source containing at least two wavelengths or frequencies. This method also requires the precise positioning of two reference sources, one for each wavelength. The positions of the reference sources may be optimized in the sense that contours will appear over a maximum object angle.

It is an object of the present invention to provide a convenient method for producing an image of an object on which contour lines are visible. This will allow the contour lines to be formed on objects which are of complex shapes or in remote or inaccessible positions. It is a further object of the invention to provide a method and apparatus for making contour maps and making measurements of objects or scenes.

Contouring is used extensively in the design and styling of automobiles, airplanes, furniture, buildings and in mapping of terrain. Contour lines are developed as aids in measuring or inspecting complex shapes of all sizes. With the present invention, very precise contour lines can be seen on objects without handling, altering or marking them. Furthermore, this invention permits contour lines to be developed on objects that are in remote or inaccessible locations. A further advantage of the present invention is the fact that the grid or contour spacing can be adjusted over a wide range, so that the invention can be used on a variety of objects. Thus, the present invention can be used extensively in design, inspection and testing applications.

The methods disclosed herein permit the contour lines to be produced either in two steps or simultaneously. After the contour fringes are produced by the doubly exposed multiple hologram, the hologram is then a record of this contour map and can be viewed at later times or other places.

In accordance with the present invention, there is provided a method and means for producing a multiple hologram of an object by directing a first beam of radiation onto the object from a source of coherent radiation, positioning a detector to receive the reflected radiation from the object, directing a reference beam of radiation at a selected angle with respect to the first beam onto the detector from a source of coherent radiation to interfere with the reflected radiation, thereby producing a pattern of interference fringes on the detector, the first beam being coherent wtih respect to the reference beam to form a cooperating pair of beams, and directing a second beam of radiation onto the object for reflection of radiation from the object onto the detector while illuminating the detector with reference beam, the second beam and the reference beam being coherent to provide a second cooperating pair of beams having a selected angle therebetween, the angles of the cooperating pairs of beams having a selected relationship so that upon reconstruction of the object there are produced multiple images of the object which interfere with each other to form interference bands which appear as contour lines.

Further in accordance with the present invention, there is provided a method and means for producing a three-dimensional contour map of an object by wavefront reconstruction wherein the multiple hologram is illuminated with coherent radiation, thereby producing multiple images of the object which interfere so that contour lines appear to be located on the surface of the object when the images are viewed.

Further in accordance with the invention, there is provided a multiple hologram produced by the method described above.

For further objects and advantages of the invention and for a more detailed understanding thereof, reference is to be had to the following description taken in conjunction with the accompanying drawings, in which:

FIG. 4 is a diagram of a system for recording contour holograms using the two-source method;

FIG. 7 is a diagram of the loci of interference lines for the two-frequency hologram;

This invention uses the methods of holography to provide an observer with an accurate measure of the depth of the surface of an object measured from some arbitrary plane of point. This is accomplished by forming a three-dimensional image of the object on which are located interference fringes corresponding to constant depth contours.

The basic methods of holography consist of illuminating the object with a beam of coherent light. Light is scattered from the object onto a detector such as a photographic plate. A second beam (reference beam) which is coherent with the first beam is directed onto the photographic plate. The reference beam may be inclined at some angle to the direction of light from the object to the plate. These two beams form an interference pattern which is recorded by the photographic plate. This record, or hologram, is then illuminated with coherent light to produce a three-dimensional image of the object.

THE WAVEFRONT RECONSTRUCTION PROCESS

Figure 1:
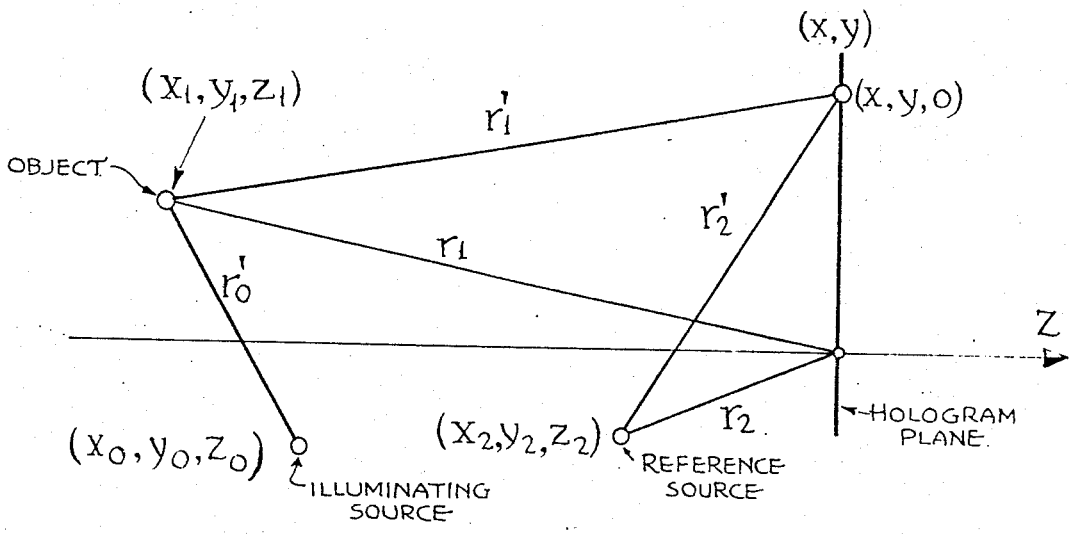
FIG. 1 is a diagrammatic view of the hologram recording process and is useful in explaining the present invention.

The hologram recording step is illustrated in FIG. 1. The complex reflectivity of the object is denoted by $s(x, y, z)$. Let the object be illuminated from a point source at $(x_0, y_0, z_0)$. The light leaving the object and arriving at the point $(x, y, 0)$ in the hologram plane may then be expressed by the Fresnel-Kirchhoff integral as $$U_1 = \frac{i}{\lambda_1} \iiint \frac{a_0}{r'_1} s(x_1, y_1, z_1) \exp[-ik_1 r'_0(x_1-x_0, y_1-y_0, z_1-z_0) - ik_1 r'_1(x-x_1, y-y_1, z_1)] dx_1 dy_1 dz_1 \quad (1)$$

where $a_0$ is the amplitude of the illuminating wave at the object, here considered to be a constant, and $k_1 = 2\pi/\lambda_1$, where $\lambda_1$ is the wavelength of the illuminating beam. The reference source produces a spherical wavefront expressed as $$U_2 = a_2 \exp[-ik_1 r'_2(x-x_2, y-y_2, z-z_2)] \quad (2)$$

where $a_2$ is the amplitude of the reference wave at the hologram.

The photographic plate is sensitive to the energy of the impinging light. Thus, the transmittance of the developed plate is proportional to the intensity of the wave.

$$T = |U_2 + U_1|^2 = |U_2|^2 + |U_1|^2 + U_2 U_1^* + U_2^* U_1 \quad (3)$$

Figure 2:
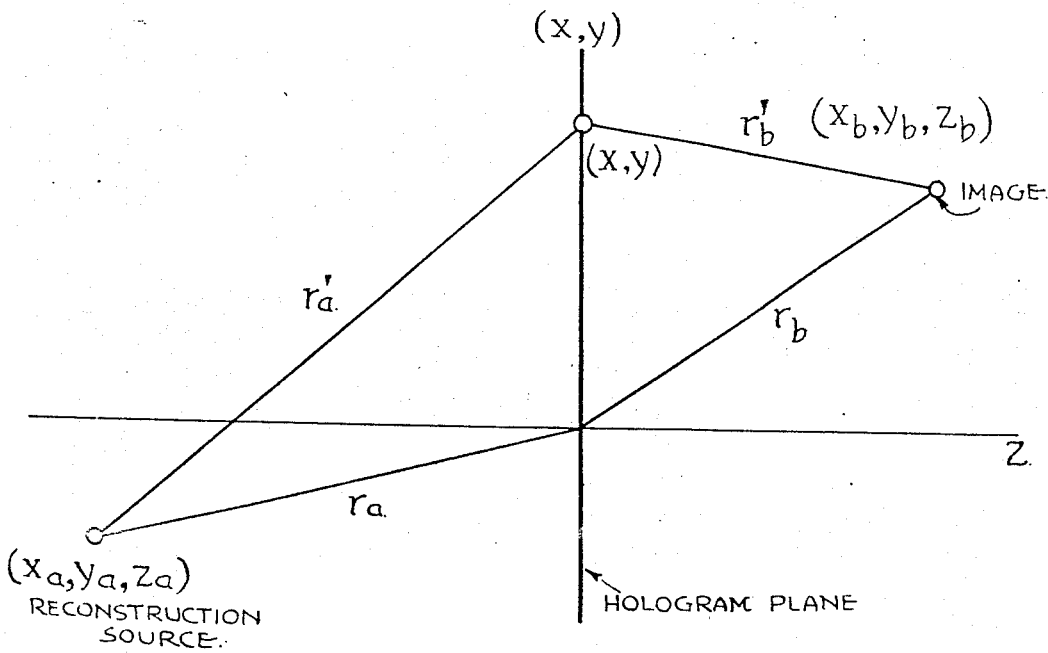
FIG. 2 is a diagram of the reconstruction process and is useful in explaining the present invention.

In the reconstruction process the hologram is illuminated as shown in FIG. 2. The terms $|U_2|^2$ and $|U_1|^2$ represent zero order diffraction whereas the terms $U_2 U_1^*$ and $U_2^* U_1$ represent the first order diffraction of the illuminating beam. The latter terms give rise to the conjugate and true image respectively. The two image terms may be written as $$\begin{Bmatrix} U_2 U_1^* \\ U_2^* U_1 \end{Bmatrix} = \frac{i}{\lambda_1} a_0 a_2 \exp[\mp ik_1 r'_2] \iiint \frac{s \exp[\pm ik_1(r'_0 + r'_1)]}{r'_1} dx_1 dy_1 dz_1 \quad (4)$$

where the upper signs refer to the conjungate image and the lower to the true image.

The light diffracted by the hologram to the image point $(x_b, y_b, z_b)$ when the hologram is illuminated by a point source at $(x_a, y_a, z_a)$ and wavelength $\lambda_2$ may be written as $$U_b = K \iint \left\{ \exp[\mp ik_1 r'_2] \iiint \frac{s}{r'_1} \exp[\pm ik_1(r'_0 + r'_1)] dx_1 dy_1 dz_1 \right\} \times \left\{ \frac{\exp[-ik_2(r'_a + r'_b)]}{r'_b} \right\} dx dy \quad (5)$$

where the constants are incorporated into K.

Let the distances $r'_b$ and $r'_1$ be so large as to allow their replacement by the constants $r_1$ and $r_b$ in the denominator. Then these terms in the denominator may be removed from the integral and absorbed into K. Equation 5 may be rewritten as $$U_b = K \iiiint s f_1 f_2 \, dx_1 dy_1 dz_1 dx dy \quad (6)$$

where $$f_1 = \exp[\pm i(k_1 r'_0 + k_1 r'_1 - k_1 r'_2 \mp k_2 r'_a)] \quad (7)$$

and $$f_2 = \exp[-ik_2 r'_b] \quad (8)$$

If $U_b$ is to become the image of the object then it must reduce to $$U_b(x_b, y_b, z_b) = Cs(x_b, y_b, z_b) \exp[-i\theta(x_b, y_b, z_b)] \quad (9)$$

where $\theta$ is an arbitrary unknown phase introduced by the process. This will occur if $$f_1 = \exp[ik_2 r'_b(x-x_1, y-y_1, z_1) - i\theta(x_1, y_1, z_1)] \quad (10)$$

If this expression is substituted into Equation 6 the result is $$U_b = K \iint \left\{ \iiint s e^{-i\theta} \exp[ik_2 r'_b(x-x_1, y-y_1, z_1)] dx_1 dy_1 dz_1 \right\} \times \{\exp[-ik_2 r'_b(x-x_b, y-y_b, z_b)]\} dx dy \quad (11)$$

This equation may be interpreted as a diffraction followed by an "inverse diffraction." Equation 11 then reduces to Equation 9 as desired.

By equating Equations 10 and 7 two solutions are obtained. One of these, which applies to the true image, occurs for $\lambda_1 = \lambda_2$, $r_a = r_2$ in which case $z_b = -z_1$, $x_b = x_1$ and $y_b = y_1$. The other solution applies to the conjugate image for $\lambda_1 = \lambda_2$, $r_a = -r_2$ giving $z_b = z_1$, $x_b = x_1$ and $y_b = y_1$.

If the expressions for the radial distances are expanded, more general expressions for image location may be derived. The reconstruction will, as a result, not be perfect. As an example consider the expression $$r'_1 = [(x-x_1)^2 + (y-y_1)^2 + (z_1)^2]^{1/2} = [(x_1^2 + y_1^2 + z_1^2) + x_1(x_1 - 2x) + y_1(y_1 - 2y)]^{1/2} \quad (12)$$

From FIG. 1 it can be seen that $x_1^2 + y_1^2 + z_1^2$ may be defined as $r_1$. Therefore, if Equation 12 is expanded about the length $r_1$ in a Taylor's series and only the first two terms are retained, the result is $$r'_1 = r_1 + \frac{x(x-2x_1) + y(y-2y_1)}{2r_1} \quad (13)$$

The distances $r'_2$, $r'_a$ and $r'_b$ may be similarly approximated Equations 7 and 8 may now be rewritten as $$f_1 = \exp\left\{ +i\left[ k_1\left(r_1 + r_0' + \frac{x(x-2x_1) + y(y-2y_1)}{2r_1}\right) - k_1\left(r_2 + \frac{x(x-2x_2) + y(y-2y_2)}{2r_2}\right) \pm k_2\left(r_a + \frac{x(x-2x_a) + y(y-2y_a)}{2r_a}\right)\right]\right\} \quad (14)$$

$$f_2 = \exp\left\{-ik_2\left[r_b + \frac{x(x-2x_b) + y(y-2y_b)}{2r_b}\right]\right\} \quad (15)$$

In order for an image to appear, Equation 14 must be expressible as $$f_1 = \exp\left\{ik_2\left[r_b + \frac{x(x-2x_b) + y(y-2y_b)}{2r_b}\right] - i\theta\right\} \quad (16)$$

where $\theta$ now includes all phase terms independent of $x$ and $y$, and $x_b$, $y_b$, $z_b$ are expressed as functions of $x_1$, $y_1$, and $z_1$.

When (16) and (14) are equated the solution is as follows $$y_b = \pm b r_b \left(\frac{y_1}{r_1} - \frac{y_2}{r_2} \pm \frac{y_a}{br_a}\right) \quad (17)$$

$$x_b = \pm b r_b \left(\frac{x_1}{r_1} - \frac{x_2}{r_2} \pm \frac{x_a}{br_a}\right) \quad (18)$$

$$r_b = \pm \frac{1}{b}\left(\frac{1}{r_1} - \frac{1}{r_2} \pm \frac{1}{br_a}\right)^{-1} \quad (19)$$

$$\theta = \mp k_1(r_0' + r_1 - r_2) + k_2(r_a - r_b) \quad (20)$$

where $$b = \frac{k_1}{k_2} = \frac{\lambda_2}{\lambda_1}$$

Magnification expressions may be derived from these equations by performing the appropriate differentiations.

Lateral magnification $M_L = \frac{\partial x_b}{\partial x_1} = \frac{\partial y_b}{\partial y_1} = \pm \frac{br_b}{r_1}$ (21)

Radial magnification $M_r = \frac{\partial r_b}{\partial r_1} = \pm \frac{br_b^2}{r_1^2} = \frac{1}{b} M_L^2$ (22)

Angular magnification $M^\alpha = \frac{\partial \alpha_b}{\partial \alpha_1} = b \frac{\sin \alpha_1}{\sin \alpha_b}$ (23)

where $\alpha_1 = \cos^{-1}\left(\frac{x_1}{r_1}\right)$ and $\alpha_b = \cos^{-1}\left(\frac{x_b}{r_b}\right)$

CONTOUR GENERATION

In order to produce a three-dimensional image with contour lines, more than the usual amount of information is required in forming the hologram. Two methods for providing this additional information are included in this invention. In one method the object is illuminated with coherent light which emanates from two different locations. The other method is one in which the coherent light source has two distinct frequencies. In both of these methods, two holograms of the object are recorded on the same detector and then the hologram is reconstructed with a single light source. The images produced from the two exposures form interference patterns which appear as contour lines on the image of the object.

One has at his disposal the wavelengths $\lambda_1$, $\lambda_2$, and the source positions $(x_0, y_0, z_0)$, $(x_2, y_2, z_2)$ and $(x_a, y_a, z_a)$. Changing the reference and/or the reconstruction source position does not add to the object information in the hologram. Changing the frequency of the reconstruction source also adds nothing. However, if the illuminating source position or frequency is changed during the exposure, or simultaneous positions or frequencies are present, then the hologram contains more object information than in the single source or frequency case. For instance, if two illuminating sources are provided, the hologram sees the object under illumination from two different angles. Similarly a multiple frequency illumination yields more information since the complex reflectivity of the object is a function of frequency.

Another way of interpreting this is to say that the hologram made by multiple source positions or wavelengths is really a multiple hologram. The reconstruction therefore contains multiple images which can interfere with each other to form interference bands. This is not the complete explanation, however, since multiple images can also be formed from an ordinary hologram by reconstructing with multiple sources or frequencies. However, it can be demonstrated that in those cases no interference occurs. A complete theory must include the phase term $\theta$. This function must be different for the two images if interference is to occur. However, once the hologram is made in the ordinary way, $\theta$ is fixed and no amount of processing in the reconstruction step can produce the desired interference pattern.

MULTIPLE ILLUMINATING SOURCES

The multiple source method will now be described. The analysis will proceed with the assumption of two source positions $(x_{01}, y_{01}, z_{01})$ and $(x_{02}, y_{02}, z_{02})$. The hologram may be made with both sources simultaneously or by a sequential exposure. In either case the hologram may be considered to be the sum of two separate holograms giving rise to two images denoted by $s_1$ and $s_2$. Since Equations 17, 18 and 19 are independent of the illuminating source position, the images occupy the same space. The only difference is in the phase of each image. Hence the images may be expressed as $s_1 = Ks \exp(\mp ik_1 r'_{01})$
$s_2 = Ks \exp A \mp ik_1 r'_{02})$ (24)

The terms of the phase which are the same for both images have been absorbed in the constant, K. The observer sees only the intensity of the combined images. Let the intensity be denoted as $I = 2K^2|s|^2(1 + \cos\ k_1[r'_{01} - r'_{02}])$ (25)

The fringes due to the interference of the phase fronts will be localized on the image since the process is equivalent to interferometry with a broad source.

Maximum brightness occurs when the argument of Equation 25 is a multiple of $2\pi$ radians.

$k_1(r'_{01} - r'_{02}) = 2n\pi$
$r'_{01} - r'_{02} = n\lambda_1$ (26)

Figure 3:
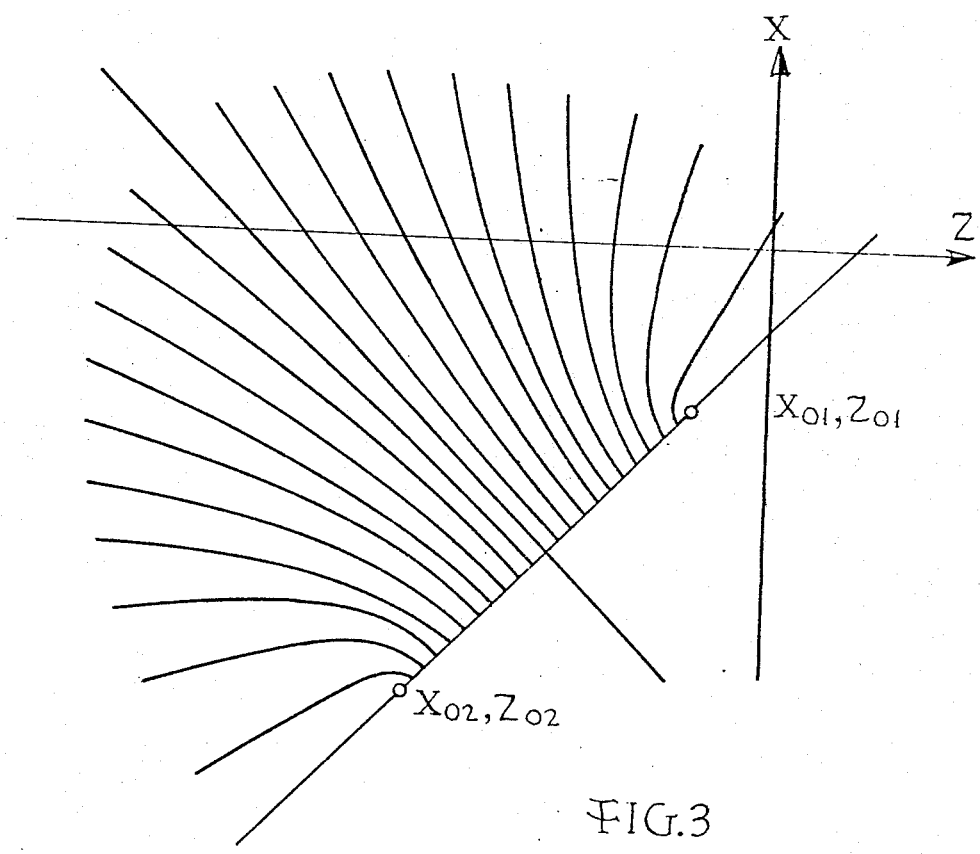
FIG. 3 is a diagram of the loci of interference for the two-source hologram in accordance with the present invention.

This expression is the equation of a family of hyperboloids of two sheets whose axes pass through the two source points. A cross-sectional view of these hyperboloids is shown in FIG. 3. If the object is placed in such an illumination then the image will have bright fringes at the locations of the curves shown. For perfect constant altitude contours the source positions $(x_{01}, y_{01}, z_{01})$, $(x_{02}, y_{02}, z_{02})$ must be removed to infinity. In addition, the angle between the propagation vectors of the two collimated beams must be bisected by a line passing through the object perpendicular to the line of sight. Then the fringe planes will be perpendicular to the line of sight as required. The distance between contours will then be $$\Delta h = \frac{\lambda_1}{\sin \Delta \gamma}$$ (27)

where $\Delta \gamma$ is the angle between the propagation vectors of the two sources.

FIG. 4 is a diagram of an embodiment of the method using light sources from two different locations. In the arrangement shown, the object is illuminated first by a beam $OB_1$ of light in position S1. This beam of light illuminates the object and this light is then scattered from the object of the detector D in the hologram plane. A reference beam R, which is coherent with the object beam $OB_1$ is directed upon the hologram plane at some angle as indicated in FIG. 4. This may be accomplished as in FIG. 4 by the use of a beamsplitter B and a mirror M1. A second exposure is then made of the object in which the illuminating beam is moved to a slightly different position S2 as indicated by the phantom lines $OB_2$. This may be accomplished by rotating the mirror M2 to its phantom line position. This second hologram can be made simultaneously or by a sequential exposure.

Figure 5:
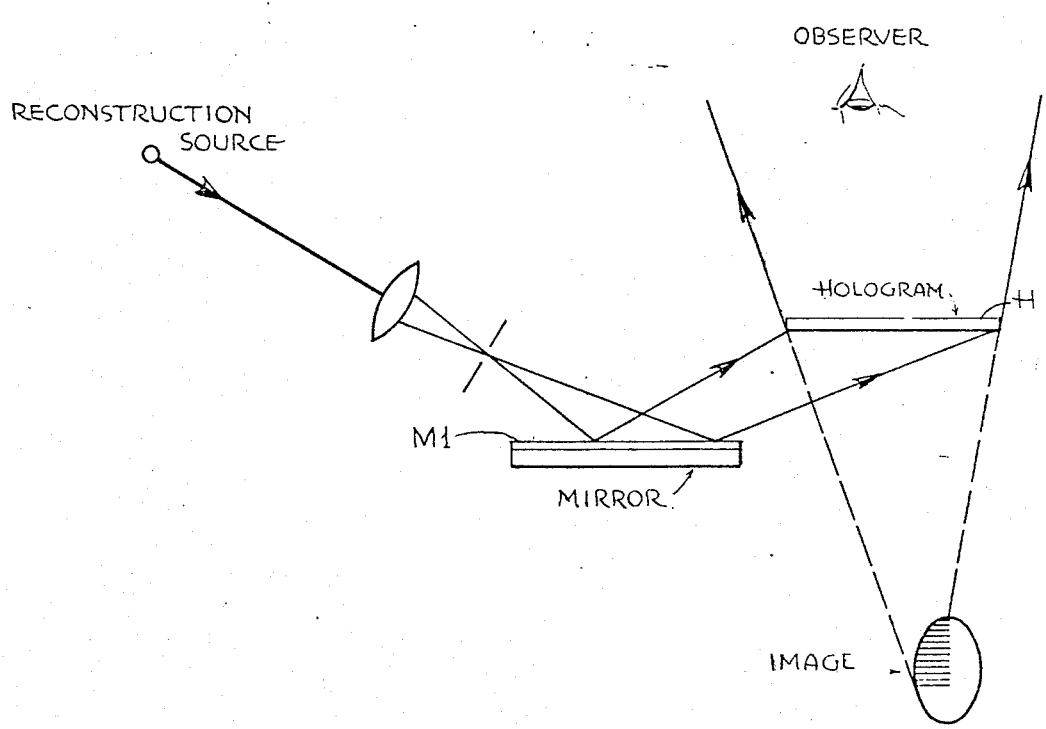
FIG. 5 is a diagram of a system for reconstructing an image of an object from a multiple hologram produced in accordance with the system of FIG. 4.

After suitably developing the detector, an image of the object is formed by illuminating the hologram with coherent light directed at approximately the same angle to the hologram as was the reference beam in FIG. 4. The object can then be viewed by the observer with light from the first-order diffraction beam, as shown in FIG. 5. The virtual image appears with contour lines on the surface of the object. In the reconstruction process, the two exposures produce two images of the object, which occupy the same space. The only difference between the two images is the phase of the light. The wavefronts carrying the two images interfere so that the fringes or contour lines appear to be localized on the surface of the object. The contour lines are located in the same manner as they would be located if the object had been illuminated with the two object beams simultaneously.

In a practical arrangement, two beams of collimated light illuminate the object and are placed so that the line bisecting the angle between them is perpendicular to the line of sight. With this geometry, the fringe planes will be perpendicular to the line of sight and the range separation or distance between contour lines is determined by Equation 27.

By suitable selection of the two source positions the constant depth fringes can be inclined at any angle.

Contour lines can be produced on an object in a similar fashion with standard interferometric equipment. This is accomplished by illuminating the object simultaneously with two beams of light which are coherent with each other. Alternate light and dark planes are produced when the difference in path length is a multiple of $\gamma/2$. Thus, constant depth contour lines will appear on the surface of the object according to the relation given above. By this invention, however, one can produce the contour lines without using the two coherent sources simultaneously and can produce a record of the three-dimensional image of the object which show the contour lines thus produced.

MULTIPLE WAVELENGTH SOURCE

The multiple wavelength or multiple frequency method involves the use of an illumination source of two or more wavelengths. For the case of two wavelengths generated from the same point source in the recording step and one wavelength in the reconstruction step, not only the phases of the two images are different, but the position and magnification as well. This difference in image position makes this method much more complicated. As an example, let the illuminating source contain the wavelengths $\lambda_{11}$ and $\lambda_{12}$ where $\lambda_{12} > \lambda_{11}$, and let the reconstruction source have the wavelength $\lambda_2$. Then from Equations 17, 18 and 19

$$|r_{b2}| > |r_{b1}|$$

$$\frac{x_{b2}}{r_{b2}} < \frac{x_{b1}}{r_{b1}}$$

$$\frac{y_{b2}}{r_{b2}} < \frac{y_{b1}}{r_{b1}} \quad (28)$$

Figure 6:
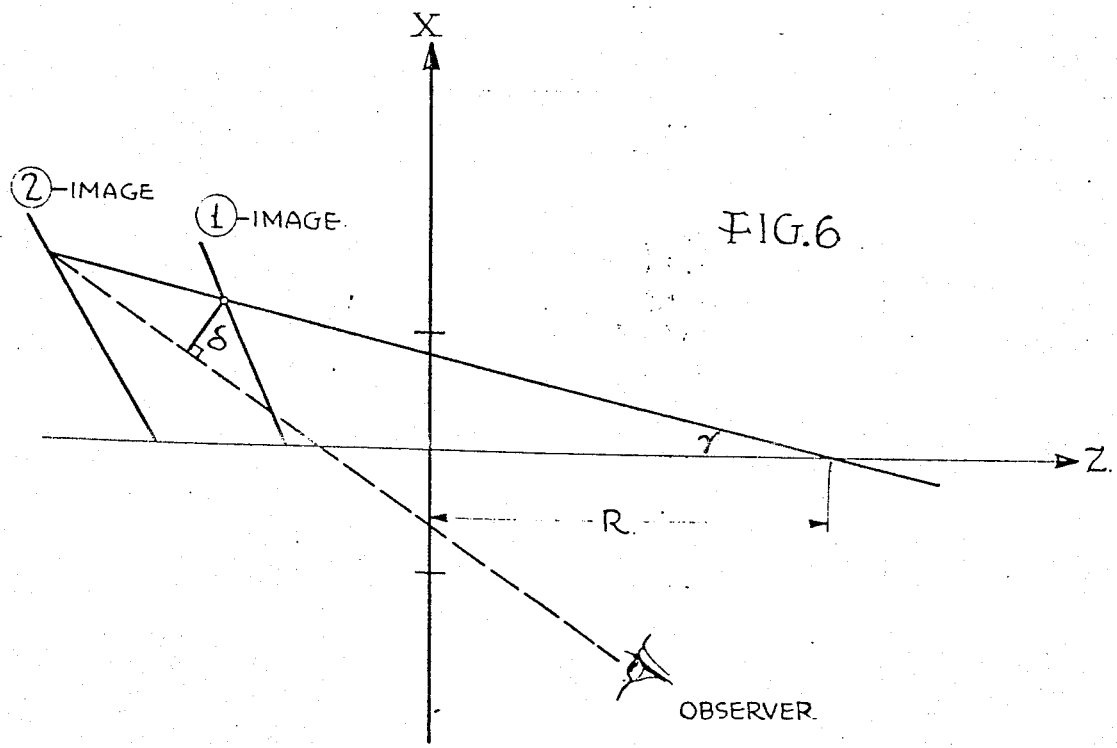
FIG. 6 is a diagram of lateral image point displacement in the two-frequency hologram.

This effect is demonstrated in FIG. 6 for two dimensions. For the position of the viewer as shown, the image points appear to be displaced. The displacement of coherent points results in fringes, not on the image but somewhere in space. Therefore the eye must be moved so as to lie on the line joining the two image points. It may happen that this line does not pass through the hologram aperture. There is, however, a way to remedy this problem and that is to arrange for the images to lie on a line passing through the desired viewing position. This may be achieved by using two reference source positions; one for each frequency. These two reference source and image positions will be designated hereinafter by a second subscript 1 and 2. Suppose that the angle of the desired line of sight as measured from the z-axis is $\gamma$. Then the particular points of the two images under observation must lie on this line. Hence, the following must hold.

$$\tan \gamma = \frac{x_{b2} - x_{b1}}{z_{b2} - z_{b1}} \quad (29)$$

This may be reduced to $$\tan \gamma = C_1 \cot \alpha_1 \quad (30)$$

where $\alpha_1 = \cos^{-1}\left(\frac{x_1}{r_1}\right)$ = angular position of the particular object point under observation and $$C_1 = \left[\frac{\frac{M_{L2} - M_{L1}}{M^2_{L2} - M^2_{L1}}}{\frac{M_{\alpha_2} - M_{\alpha_1}}{M_{\alpha_2} - M_{\alpha_1}}}\right]$$

Theoretically Equation 30 may be solved to provide the necessary relationship between the angular positions of the two reference sources. However, it cannot be solved explicitly since the magnifications are not constants.

If the additional constraint is made that the line of sight to the geometrical center of interest on the object passes through the origin considerable simplification results. This line of sight is designated the centroid line of sight. Since the origin may be defined by this viewing situation, no generality is lost. In this case all that is required is that the angular position of the two image points are the same. That is, $$\frac{x_{b2}}{r_{b2}} = \frac{x_{b1}}{r_{b1}}$$

This results in the relationship $$\frac{x_{22}}{r_{22}} = \frac{\lambda_{12}}{\lambda_{11}} \frac{x_{21}}{r_{21}} - \frac{\Delta\lambda_1}{\lambda_{11}} \frac{x_1}{r_1} \quad (31)$$

Thus, for any one point on the object, Equation 31 gives the reference source angular position relationship. Once these positions are chosen, then only one pair of points on the images lie on the light of sight. For any other point on the object the corresponding image points lie on a different line. Consequently, if the observer remains stationary, an apparent lateral placement between the two images exists and becomes progressively greater for points farther off the axis of alignment. This effect gives rise to the question, "What is the maximum solid angle over which contours may be observed?" The answer, of course, is directly related to the apparent lateral displacement.

Assume that the images have been positioned so that no lateral shift is apparent. If the distance between corresponding image points $\Delta r_b$, is small, then the effective phase difference between the wavefronts which leave the two images is $$\theta_2 - \theta_1 + k_2 \Delta r_b \quad (32)$$

where $\theta_1$, $\theta_2$ are the phase terms associated with the images due to the wavelengths $\lambda_1$, $\lambda_2$ respectively. The maximum image brightness occurs when $$\theta_2 - \theta_1 + k_2 \Delta r_b = 2n\pi$$

which reduces to $$r_0' + r_1 = \frac{n\lambda_{11}\lambda_{12}}{\Delta\lambda_1} + C_2 \quad (33)$$

where $$C_2 = \frac{\lambda_{12}r_{21} - \lambda_{11}r_{22}}{\Delta\lambda_1} \quad (33)$$

This expression is the equation for a family of ellipsoids whose major axes pass through the origin and the illuminating source position. A two-dimensional sketch appears in FIG. 7. From this sketch it can be seen that the image will appear as though the object was set in the field of ellipsoidal surfaces. If the illuminating source $(x_0, y_0, z_0)$ is placed at the origin, the surfaces become spherical. Then the interference surfaces represent true constant range contours measured from the origin.

If the illumination source is placed anywhere along the desired line of sight, then the range separation along the line of sight between fringes becomes.

$$\Delta r_1 = \frac{\lambda_{11}\lambda_{12}}{2\Delta\lambda_1} \quad (34)$$

If this same range separation is desired off the major axis then the illumination source must be placed at the origin to obtain spherical surfaces. If the range to the object is large with respect to the size of the object, then the contours represent planar cross-sections.

The determination of the solid angle over which true contour fringes appear is a complicated procedure and may best be solved with a computer. There is an optimum viewing position which is dependent upon the observing aperture size. If the aperture size is fixed, then the maximum solid angle depends upon the relative positions of the two reference sources. Thus, an optimum configuration for making and reconstructing the hologram does exist in the sense that the reconstruction contains contour fringes over the largest possible object solid angle.

Figure 8:
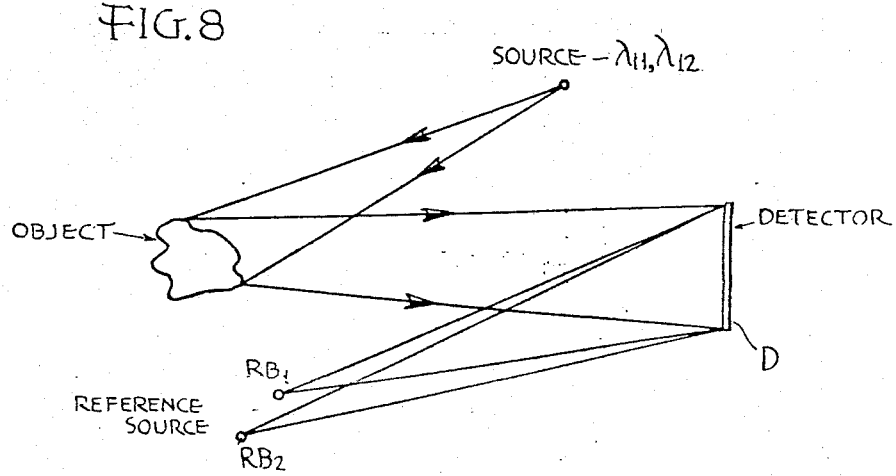
FIG. 8 is a diagram of a system for recording contour holograms using the two-frequency method.

An example of the two-frequency or two-wavelength construction process is shown in FIG. 8. The object is illuminated with a beam of light at frequency $\lambda_{11}$ and a beam at frequency $\lambda_{12}$. It is to be understood that both frequencies may be on simultaneously or alternately in practicing this method and the beams may originate from the same or different source locations. Thus, it will be seen that in the preferred embodiment shown in FIG. 8, there are two beams of light, each containing a different frequency but emanating from the same location. Radiation from the composite beam or beams in FIG. 8 is scattered by the object onto the hologram plane of detector D. Two reference beams, $RB_1$ and $RB_2$, one associated with each frequency, are directed upon the detector D at two angles as illustrated. For special uses, the reference beams may be at the same angle. It will be understood that the reference beam $RB_1$ has a frequency of $\lambda_{11}$ and the reference beam $RB_2$ has a frequency of $\lambda_{12}$.

Thus, it will be seen that two holograms are formed on the same detector surface, one for each wavelength $\lambda_{11}$ and $\lambda_{12}$ used in the illuminating beams. This multiple hologram, after suitable development of the detector, is illuminated with coherent light of wavelength $\lambda_2$ so that the images formed in the preceding recording step are reconstructed. These images of the object are magnified or demagnified depending upon the ratio of the wavelength of the reconstruction radiation of the wavelength of the construction radiation.

Figure 9:
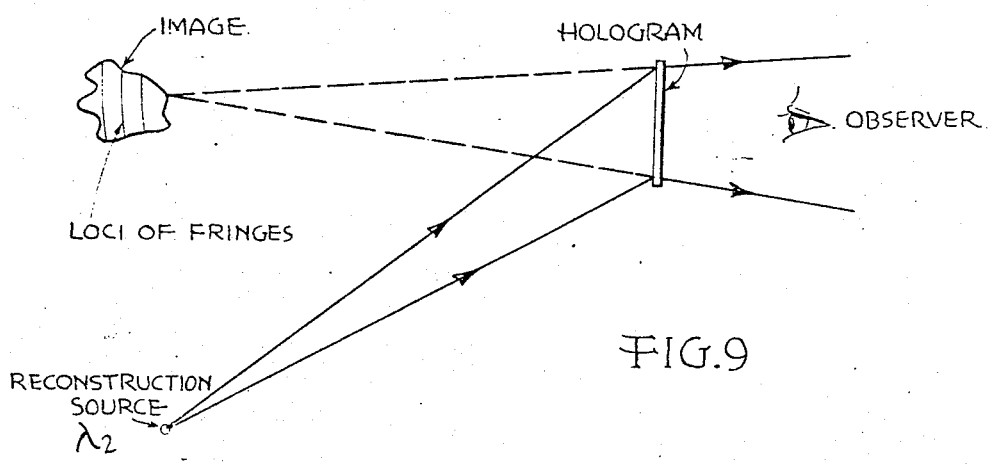
FIG. 9 is a diagram for reconstruction of an image of the object from a multiple hologram produced in accordance with the system of FIG. 8.

An example of the reconstruction process is shown in FIG. 9. The hologram is illuminated with a beam of coherent radiation with a wavelength $\lambda_2$. Two images of the object appear and the positions of the images are such that the point of interest on both images is in the line of sight. This is effected by positioning the two reference beams $RB_1$ and $RB_2$ in the construction process. This positioning of the two reference beams depends upon the ratio of the two wavelengths $\lambda_{11}$ and $\lambda_{12}$ used in the illuminating source and relative positions of the reference beam and the object point.

The image of the object appears with light and dark fringes on the surface. These fringes or contour lines represent surfaces which are ellipsoids whose major axes pass through the hologram and the position of the source of light that illuminated the object.

Figure 10:
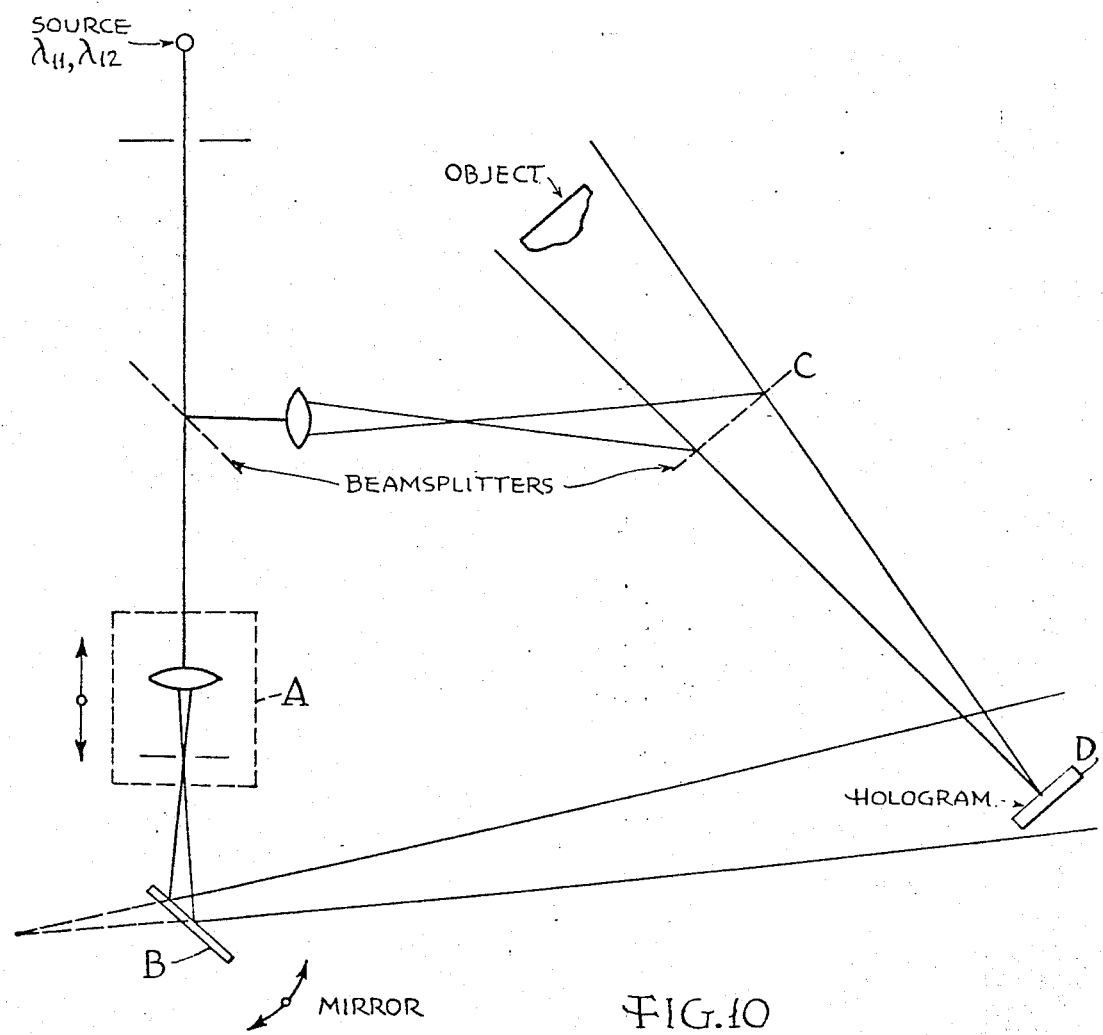
FIG. 10 is a diagram of a system for a contour hologram using the two-frequency method.

A preferred embodiment of the two-frequency system is illustrated in FIG. 10 in which the contour lines produced represent spherical surfaces centered at the hologram. This is accomplished by having the effective position of the illuminating source in the hologram plane. As shown in FIG. 10, the reference beam position is determined by the pinhole in the pinhole assembly A and the angle of incidence of the reference beam is adjusted by the mirror B. Thus, one exposure can be made using radiation of wavelength $\lambda_{11}$ with the mirror and pinhole setting as shown. Then the second exposure is made using the radiation of wavelength $\lambda_{12}$ and the reference beam angle and the distance are altered by rotating the mirror B and moving the pinhole assembly A respectively. The angle of incidence of the reference beam for the second exposure is determined so that the image point in the object is common for both images. Then the distance between the reference beam and the hologram is adjusted in order to optimize the area over which contour lines will appear.

In an actual application of this system, the parts were positioned as illustrated in FIG. 10. The source was an argon-ion laser. The colors of this laser were spatially separated by a double pass through a prism. A rotatable mirror external to the equipment illustrated in FIG. 10 was used to tune the various colors out of the hologram system. Two lines separated by 65 A. were used for the process.

The hologram was made in one color. Then, after development, it was replaced in the system and positioned for minimum fringes of interference between the object and the hologram image. Then the laser beam was positioned so that the adjacent color entered the system. The reconstructed image will then be displaced from the image and be magnified or demagnified depending upon whether the second color is of higher or lower frequency than the first. This represents exactly what happens if the hologram is made in two colors with a single reference source position.

By rotating mirror B, the image may be made to fall onto the object. The system now represents the case where the hologram is made with two frequencies and a reference beam for each frequency at different angular positions but at equal distances. In this case, the object represents one of the images that results from a two-frequency hologram. By focusing a telescope on a particular point on the object and manipulating mirror B, the corresponding image point may be made to superimpose on the object point. When this is done, fringes appear in the vicinity of this point. Photographs of such fringing have been taken where the object was a stainless steel sphere three inches in diameter.

In order to enlarge the area over which contours appear, the magnification and axial position of the image was changed by moving pinhole assembly A as shown in FIG. 10. This is equivalent to changing the distance of one of the reference beams. A photograph of the object was taken when this distance was optimum. The contours in the photograph represented the intersection of a family of spheres with the object surface. From Equation 34, the spheres differed in radius by $$\frac{\lambda_{11}, \lambda_{12}}{2\Delta\lambda_1}$$

which for the frequency used was 0.02 millimeter.

Two methods for obtaining three-dimensional images with constant range contours superimposed on them have been described. The simpler method requires the use of two illuminating sources at slightly different angular positions. The second method requires an illumination source containing two discrete frequencies and a reference source for each frequency. The position of each reference source must be precisely determined in order to obtain fringing over the maximum possible object angle.

These methods may be generalized to obtain other types of fringing. Specifically, multiple sources or frequencies can be used. If this is done, then fringe sharpening may be expected analogous to those obtained in a Fabre-Perot interferometer. Alternatively, certain contours may be picked out by appropriate weighting of the amplitude and/or phase of the source or frequencies.

For the multiple source method the fringe distribution and shape are related to the autocorrelation of the spatial intensity distribution of the sources. For the multiple frequency method it is the autocorrelation of the frequency spectrum that determines the fringe shape and spacing.

It shall be understood the invention is not limited to the specific arrangements shown and that changes and modifications may be made within the scope of the appended claims.

What is claimed is:

1. A method of producing a multiple hologram of an object comprising:
    (a) directing a first beam of radiation onto the object from a source of coherent radiation,
    (b) positioning a detector to receive the reflected radiation from the object,
    (c) directing a reference beam of radiation at a selected angle with respect to said first beam onto the detector from a source of coherent radiation to interfere with the reflected radiation, thereby producing a pattern of interference fringes on the detector, the first beam being coherent with respect to the reference beam to form a cooperating pair of beams, and
    (d) directing a second beam of radiation onto the object for reflection of radiation from the object onto said detector while illuminating said detector with said reference beam, said second beam and said reference beam being coherent to provide a second cooperating pair of beams having a selected angle therebetween, said first and second beams of radiation having a finite angle therebetween so that upon reconstruction of the object there are produced multiple images of the object which interfere with each other to form interference bands.

2. A method of producing a multiple hologram of an object comprising:
(a) directing a first beam of radiation onto the object from a source of coherent radiation,
(b) positioning a detector to receive the reflected radiation from the object,
(c) directing first reference beam of radiation at a selected angle with respect to said first beam onto the detector from a source of coherent radiation to interfere with the reflected radiation, thereby producing a pattern of interference fringes on the detector, the first beam being coherent with respect to the first reference beam to form a cooperating pair of beams, and
(d) directing a second beam of radiation onto the object for reflection of radiation from the object onto said detector while illuminating said detector with a second reference beam, said second beam and said second reference beam being coherent to provide a second cooperating pair of beams having a selected angle therebetween, said first cooperating pair of beams having a frequency different from said second cooperating pair of beams so that upon reconstruction of the object there are produced multiple images of the object which interfere with each other to form interference bands.

3. A method of producing a three-dimensional contour map of an object by wavefront reconstruction comprising:
(a) directing a first beam of radiation onto the object from a source of coherent radiation,
(b) positioning a detector to receive the reflected radiation from the object,
(c) directing a reference beam of radiation at a selected angle with respect to the said first beam onto the detector from a source of coherent radiation to interfere with the reflected radiation, thereby producing a pattern of interference fringes on the detector, the first beam being coherent with respect to the reference beam to form a cooperating pair of beams,
(d) directing a second beam of radiation onto the object for reflection of radiation from the object onto said detector while illuminating said detector with said reference beam, said second beam and said reference beam being coherent to provide a second cooperating pair of beams having a selected angle therebetween, said first and second beams of radiation having a finite angle between,
(e) developing said detector to produce a multiple hologram of the object, and
(f) illuminating said multiple hologram with coherent radiation, thereby producing multiple images of the object which interfere so that contour lines appear to be located on the surface of the object when the virtual image is viewed.

4. A method of producing a three-dimensional contour map of an object by wavefront reconstruction comprising:
(a) directing a first beam of radiation onto the object from a source of coherent radiation,
(b) positioning a detector to receive the reflected radiation from the object,
(c) directing a first reference beam of radiation at a selected angle with respect to the said first beam onto the detector from a source of coherent radiation to interfere with the reflected radiation, thereby producing a pattern of interference fringes on the detector, the first beam being coherent with respect to the first reference beam to form a cooperating pair of beams,
(d) directing a second beam of radiation onto the object for reflection of radiation from the object onto said detector while illuminating said detector with a second reference beam, said second beam and said second reference beam being coherent to provide a second cooperating pair of beams having a selected angle therebetween, said first cooperating pair of beams having a frequency different from said second cooperating pair of beams,
(e) developing said detector to produce a multiple hologram of the object, and
(f) illuminating said multiple hologram with coherent radiation, thereby producing multiple images of the object which interfere so that contour lines appear to be located on the surface of the object when the virtual image is viewed.

5. A method of producing a three-dimensional contour map according to claim 4 wherein said first beam of radiation has an apparent point source position at the center of said detector so that upon reconstruction the contour lines appearing on the object represent spherical surfaces centered at the center of the hologram.

6. Apparatus for producing a multiple hologram of an object comprising:
(a) means for directing a first beam of radiation onto the object from a source of coherent radiation,
(b) a detector positioned to receive the reflected radiation from the object,
(c) means for directing a reference beam of radiation at a selected angle with respect to said first beam onto said detector from a source of coherent radiation to interfere with the reflected radiation, thereby producing a pattern of interference fringes on said detector, the first beam being coherent with respect to the reference beam to form a cooperating pair of beams, and
(d) means for directing a second beam of radiation onto the object for reflection of radiation from the object onto said detector while illuminating said detector with said reference beam, said second beam and said reference beam being coherent to provide a second cooperating pair of beams having a selected angle therebetween, said first and second beams of radiation having a finite angle therebetween so that upon reconstruction of the object there are produced multiple images of the object which interfere with each other to form interference bands.

7. Apparatus for producing a multiple hologram of an object comprising:
(a) means for directing a first beam of radiation onto the object from a source of coherent radiation,
(b) a detector positioned to receive the reflected radiation from the object,
(c) means for directing a first reference beam of radiation at a selected angle with respect to said first beam onto said detector from a source of coherent radiation to interfere with the reflected radiation, thereby producing a pattern of interference fringes on said detector, the first beam being coherent with respect to the first reference beam to form a cooperating pair of beams, and
(d) means for directing a second beam of radiation onto the object for reflection of radiation from the object onto said detector while illuminating said detector with a second reference beam, said second beam and said second reference beam being coherent to provide a second cooperating pair of beams having a selected angle therebetween, the source of radiation for said first cooperating pair of beams having a frequency different from the source of radiant energy for said second cooperating pair of beams so that upon reconstruction of the object there are produced multiple images of the object which interfere with each other to form interference bands.

8. A method of producing a multiple hologram according to claim 4 wherein each of said first and second reference beams is directed onto said detector at different angles therewith.

9. Apparatus for producing a multiple hologram according to claim 7 including adjustable means for directing each of said first and second reference beams onto said detector at different angles therewith.

10. A method of producing a three-dimensional contour map according to claim 3 comprising an additional step of:
 (g) viewing the contoured virtual image of the object along a line of sight that is perpendicular to a line bisecting said finite angle between the first and second beams of radiation that illuminated the object while exposing the detector.

11. A method of producing a three-dimensional contour map according to claim 4 wherein said first and second beams of radiation have apparent point sources positioned along a line joining a point of the object and said detector, and wherein the method comprises an additional step of:
 (g) viewing the contoured virtual image of the object along said line as a line of sight.

12. A method of producing a multiple hologram according to claim 1 wherein the step of directing a second beam of radiation onto the object occurs after the step of directing a first beam onto the object is completed.

13. A method of producing a multiple hologram according to claim 2 wherein the step of directing a second beam of radiation onto the object occurs after the step of directing a first beam onto the object is completed.

14. A method of producing a three-dimensional contour map of an object, comprising the steps of:
 (a) directing a first beam of radiation of a first wavelength onto the object from a source of coherent radiation,
 (b) positioning a detector to receive the reflected radiation from the object,
 (c) directing a reference beam of radiation at a selected finite angle with respect to the said first beam onto the detector from a source of coherent radiation to interfere with the reflected radiation, the first beam being mutually coherent with respect to the reference beam, thereby producing a pattern of interference fringes on the detector to form a hologram,
 (d) directing a reconstructing beam of coherent radiation of a second distinct wavelength onto the hologram in a manner to form therefrom an image of said object,
 (e) positioning the object with said reconstructed image, and
 (f) directing onto said object a second beam of coherent radiation mutually coherent with said reconstructing radiation, whereby contour lines are formed on said object in real time.

References Cited

Leith et al.: Investigation of Hologram Techniques, AD 476267, December, 1965, pp. 2–4 and 44–56.

RONALD L. WIBERT, Primary Examiner

O. B. CHEW II, Assistant Examiner

U.S. Cl. X.R.

350—3.5